（12) United States Patent
Boney

(10) Patent No.: US 8,201,243 B2
(45) Date of Patent: Jun. 12, 2012

(54) BACKWARDS RESEARCHING ACTIVITY INDICATIVE OF PESTWARE

(75) Inventor: Matthew L. Boney, Longmont, CO (US)

(73) Assignee: Webroot Inc., Broomfield, CO (US)

( * ) Notice: Subject to any disclaimer, the term of this patent is extended or adjusted under 35 U.S.C. 154(b) by 1150 days.

(21) Appl. No.: 11/408,146

(22) Filed: Apr. 20, 2006

(65) Prior Publication Data
US 2007/0250817 A1 Oct. 25, 2007

(51) Int. Cl.
G06F 21/00 (2006.01)
(52) U.S. Cl. .......... 726/22; 713/164; 713/202; 380/279; 717/124; 726/27
(58) Field of Classification Search ............ 726/22
See application file for complete search history.

(56) References Cited

U.S. PATENT DOCUMENTS

| | | | |
|---|---|---|---|
| 5,623,600 | A | 4/1997 | Ji et al. |
| 5,920,696 | A | 7/1999 | Brandt et al. |
| 5,951,698 | A | 9/1999 | Chen et al. |
| 6,069,628 | A | 5/2000 | Farry et al. |
| 6,073,241 | A | 6/2000 | Rosenberg et al. |
| 6,092,194 | A | 7/2000 | Touboul |
| 6,154,844 | A | 11/2000 | Touboul |
| 6,167,520 | A | 12/2000 | Touboul |
| 6,310,630 | B1 | 10/2001 | Kulkarni et al. |
| 6,397,264 | B1 | 5/2002 | Stasnick et al. |
| 6,405,316 | B1 | 6/2002 | Krishnan et al. |
| 6,460,060 | B1 | 10/2002 | Maddalozzo, Jr. et al. |
| 6,480,962 | B1 | 11/2002 | Touboul |
| 6,535,931 | B1 | 3/2003 | Celi, Jr. |
| 6,611,878 | B2 | 8/2003 | De Armas et al. |
| 6,633,835 | B1 | 10/2003 | Moran et al. |
| 6,667,751 | B1 | 12/2003 | Wynn et al. |
| 6,701,441 | B1 | 3/2004 | Balasubramaniam et al. |
| 6,772,345 | B1 | 8/2004 | Shetty |
| 6,785,732 | B1 | 8/2004 | Bates et al. |
| 6,804,780 | B1 | 10/2004 | Touboul |
| 6,813,711 | B1 | 11/2004 | Dimenstein |
| 6,829,654 | B1 | 12/2004 | Jungek |

(Continued)

FOREIGN PATENT DOCUMENTS
WO WO 98/45778 10/1998
(Continued)

OTHER PUBLICATIONS

Elements of Computer Security|http://www.google.com/url?sa=t&rct=j&q=&esrc=s&frm=1&source=web&cd=8&ved=0CEwQFjAH&url=http%3A%2F%2Fcms.vle.ase.md%2Fget%2Fpdf%2F7664&ei=_pzyTp3mMeLL0QG7-9zLAg&usg=AFQjCNEmOz7OxykRPyP1_ePiXGgJI1WGWA&sig2=XE_fLI7CTuchuObMdbGYtA|David Salomon|2010.*

(Continued)

Primary Examiner — Taghi Arani
Assistant Examiner — Mahfuzur Rahman
(74) Attorney, Agent, or Firm — Cooley LLP

(57) ABSTRACT

A system and method for researching an identity of a source of activity that is indicative of pestware is described. In one embodiment the method comprises monitoring the computer for activity that is indicative of pestware, identifying, based upon the activity, an object residing on the computer that is a suspected pestware object; and accessing at least a portion of a recorded history of sources that the computer received files from so as to identify a reference to an identity of a particular source that the suspected pestware object originated from.

14 Claims, 5 Drawing Sheets

U.S. PATENT DOCUMENTS

| | | | |
|---|---|---|---|
| 6,910,134 B1 | 6/2005 | Maher et al. | |
| 6,965,968 B1 | 11/2005 | Touboul | |
| 7,058,822 B2 | 6/2006 | Edery et al. | |
| 7,058,976 B1* | 6/2006 | Dark | 726/23 |
| 7,107,617 B2 | 9/2006 | Hursey et al. | |
| 7,849,185 B1* | 12/2010 | Rockwood | 709/224 |
| 2002/0078381 A1* | 6/2002 | Farley et al. | 713/201 |
| 2002/0162015 A1 | 10/2002 | Tang | |
| 2002/0162017 A1 | 10/2002 | Sorkin | |
| 2002/0166063 A1 | 11/2002 | Lachman et al. | |
| 2003/0065943 A1* | 4/2003 | Geis et al. | 713/201 |
| 2003/0074581 A1 | 4/2003 | Hursey et al. | |
| 2003/0101381 A1 | 5/2003 | Mateev et al. | |
| 2003/0154399 A1* | 8/2003 | Zuk et al. | 713/201 |
| 2003/0159070 A1* | 8/2003 | Mayer et al. | 713/201 |
| 2003/0217287 A1 | 11/2003 | Kruglenko | |
| 2004/0024864 A1* | 2/2004 | Porras et al. | 709/224 |
| 2004/0030914 A1 | 2/2004 | Kelley et al. | |
| 2004/0034794 A1 | 2/2004 | Mayer et al. | |
| 2004/0064515 A1* | 4/2004 | Hockey | 709/206 |
| 2004/0064736 A1 | 4/2004 | Obrecht et al. | |
| 2004/0080529 A1 | 4/2004 | Wojcik | |
| 2004/0143763 A1 | 7/2004 | Radatti | |
| 2004/0187023 A1 | 9/2004 | Alagna et al. | |
| 2004/0225877 A1* | 11/2004 | Huang | 713/100 |
| 2005/0005160 A1 | 1/2005 | Bates | |
| 2005/0038697 A1 | 2/2005 | Aaron | |
| 2005/0120242 A1* | 6/2005 | Mayer et al. | 713/201 |
| 2005/0138433 A1 | 6/2005 | Linetsky | |
| 2005/0154885 A1 | 7/2005 | Viscomi et al. | |
| 2005/0268112 A1* | 12/2005 | Wang et al. | 713/188 |
| 2006/0085528 A1* | 4/2006 | Thomas | 709/223 |
| 2006/0230290 A1* | 10/2006 | Burtscher | 713/188 |
| 2007/0074289 A1* | 3/2007 | Maddaloni | 726/23 |
| 2007/0094725 A1* | 4/2007 | Borders | 726/22 |
| 2007/0168694 A1* | 7/2007 | Maddaloni et al. | 714/4 |
| 2007/0169198 A1* | 7/2007 | Madddaloni et al. | 726/24 |
| 2007/0220043 A1* | 9/2007 | Oliver et al. | 707/103 R |

FOREIGN PATENT DOCUMENTS

| | | |
|---|---|---|
| WO | WO 9845778 A2 * | 10/1998 |
| WO | PCT/US2006/025378 | 9/2007 |
| WO | PCT/US2007/067078 | 11/2007 |
| WO | PCT/US2007/067084 | 11/2007 |
| WO | PCT/US2006/041798 | 12/2007 |

OTHER PUBLICATIONS

PCT/US2007/067076 International Search Report and Written Opinion of the International Searching Authority mailed Nov. 2, 2007.
U.S. Appl. No. 10/956,573, filed Oct. 1, 2004, Steve Thomas.
U.S. Appl. No. 10/956,574, filed Oct. 1, 2004, Steve Thomas.
U.S. Appl. No. 10/956,818, filed Oct. 1, 2004, Matthew Boney.
U.S. Appl. No. 11/257,609, filed Oct. 25, 2005, Michael Burtscher.
U.S. Appl. No. 11/237,291, filed Sep. 28, 2005, Philip Maddaloni.
U.S. Appl. No. 11/408,215, filed Apr. 20, 2006, Matthew Boney.
U.S. Appl. No. 11/408,145, filed Apr. 20, 2006, Matthew Boney.
Codeguru, Three Ways to Inject Your Code Into Another Process, by Robert Kuster, Aug. 4, 2003, 22 pgs.
Codeguru, Managing Low-Level Keyboard Hooks With the Windows API for VB .Net, by Paul Kimmel, Apr. 18, 2004, 10 pgs.
Codeguru, Hooking the Keyboard, by Anoop Thomas, Dec. 13, 2001, 6 pgs.
Illusive Security, Wolves in Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 6 pgs.
Microsoft.com, How to Subclass a Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.
Yurcik, William et al., A Planning Framework for Implementing Virtual Private Networks, Jun. 2001, IT Pro, IEEE, pp. 41-44.

* cited by examiner

BACKWARDS RESEARCHING ACTIVITY INDICATIVE OF PESTWARE

RELATED APPLICATIONS

The present application is related to commonly owned and assigned application Ser. No. 10/956,573, now U.S. Pat. No. 7,480,683, entitled System and Method For Heuristic Analysis to Identify Pestware; application Ser. No. 10/956,574, now U.S. Pat. No. 7,533,131, entitled System and Method for Pestware Detection and Removal; application Ser. No. 10/956,818, entitled System and Method for Locating Malware and Generating Malware Definitions; application Ser. No. 11/257,609, entitled System and Method for Kernel-Level Pestware Management; application Ser. No. 11/237,291, entitled Client Side Exploit Tracking; application Ser. No. 11/408,215, entitled Backward Researching Existing Pestware, filed herewith; and application Ser. No. 11/408,145, entitled Backward Researching Time Stamped Events to Find an Origin of Pestware, filed herewith, which are incorporated herein by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer system management. In particular, but not by way of limitation, the present invention relates to systems and methods for detecting, controlling and/or removing pestware.

BACKGROUND OF THE INVENTION

Personal computers and business computers are continually attacked by trojans, spyware, and adware, collectively referred to as "malware," "spyware" or "pestware." These types of programs generally act to gather information about a person or organization—often without the person or organization's knowledge. Some pestware is highly malicious. Other pestware is non-malicious but may cause issues with privacy or system performance. And yet other pestware is actually beneficial or wanted by the user. Unless specified otherwise, "pestware" as used herein refers to any of these programs that collects information about a person or an organization.

Software is presently available to detect and remove pestware. But as it evolves, the software to detect and remove it must also evolve. Accordingly, current techniques and software for removing pestware are not always satisfactory and will most certainly not be satisfactory in the future. Additionally, because some pestware is actually valuable to a user, pestware-detection software should, in some cases, be able to handle differences between wanted and unwanted pestware.

Current pestware removal software uses definitions of known pestware to search for and remove files on a protected system. These definitions are often slow and cumbersome to create. Additionally, it is often difficult to initially locate the pestware in order to create the definitions. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for researching an identity of a source of activity that is indicative of pestware. In one embodiment the method comprises monitoring the computer for activity that is indicative of pestware, identifying, based upon the activity, an object residing on the computer that is a suspected pestware object and accessing at least a portion of a recorded history of sources that the computer received files from so as to identify a reference to an identity of a particular source that the suspected pestware object originated from.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
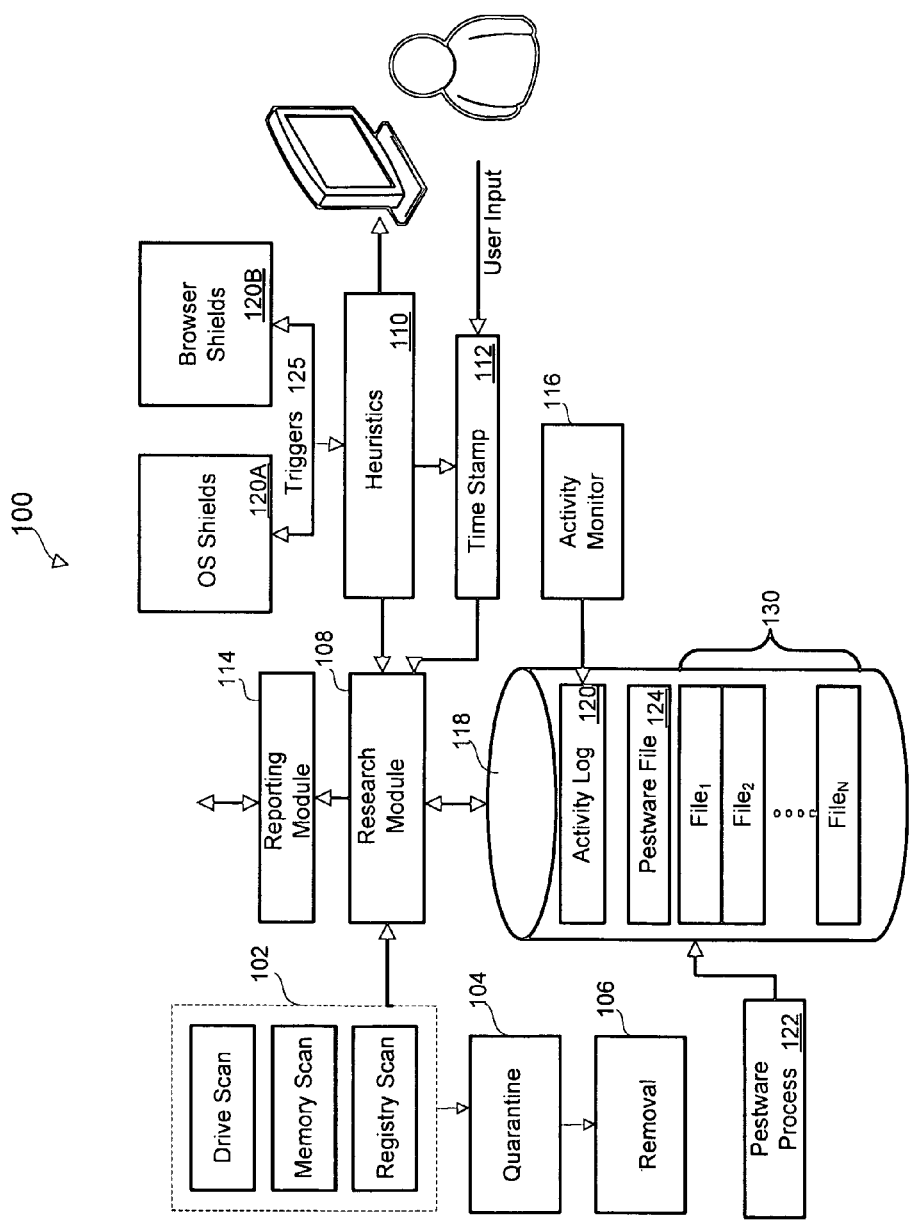
FIG. 1 illustrates a block diagram of one implementation of the present invention.

Referring now to the drawings, where like or similar elements are designated with identical reference numerals throughout the several views, and referring in particular to FIG. 1, it illustrates a block diagram of one implementation of the present invention. Shown is a protected computer 100 that includes a detection module 102, quarantine module 104, removal module 106, and shields 120. In addition, a research module 108 is shown coupled to a heuristics module 110, a time stamp module 112 and a reporting module 114.

Each of these modules can be implemented in software or hardware. And if implemented in software, the modules can be implemented in a single software package or in multiple software packages. In addition, one of ordinary skill in the art will recognize that the software can be designed to operate on any type of computer system including WINDOWS and Linux-based systems. Additionally, the software can be configured to operate on personal computers and/or servers. For convenience, embodiments of the present invention are generally described herein with relation to WINDOWS-based systems. Those of skill in the art can easily adapt these implementations for other types of operating systems or computer systems.

Also shown is a file storage device 118 that is coupled to the research module 108 and an activity monitor 116. In this embodiment the file storage device includes an activity log 120, a pestware file 124 and a collection of N files 130. The file storage device 118 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 118, which is depicted for convenience as a single storage device, may be realized by multiple (e.g., distributed) storage devices.

In the exemplary embodiment, the pestware file 124, corresponds to (e.g., includes data relating to) a pestware process 122 operating in memory. The pestware process 122 is exemplary of pestware processes that are configured to make one or more unauthorized alterations to the computer 100. For example, the pestware process 122 may make changes to either or both of the browser settings and/or operating system (OS) settings without approval and/or the knowledge of the user.

In accordance with several embodiments, the research module 108 is configured to receive an indication that either known pestware is residing on the computer or activities indicative of pestware have occurred or are occurring on the protected computer. In response, the research module 108 is configured to research the activity log 120 and/or the N files 130, which include information (e.g., historical logs) relating to events on the computer 100, to identify a source of the pestware 122, 124 or pestware-related activities, which may be reported by the reporting module 114 to a centralized data store for subsequent pestware management purposes.

For example, the identities (e.g., I.P. address, URL, email client or program name) of sources (e.g., web sites, email or program) of the pestware may be collected in a centralized data store (not shown) and then subsequently reported to other users. In addition, the sources of the pestware or suspected pestware may be visited to further research how the pestware is being distributed from the URLs and/or to generate new definitions for pestware discovered at these sources.

Figure 2:
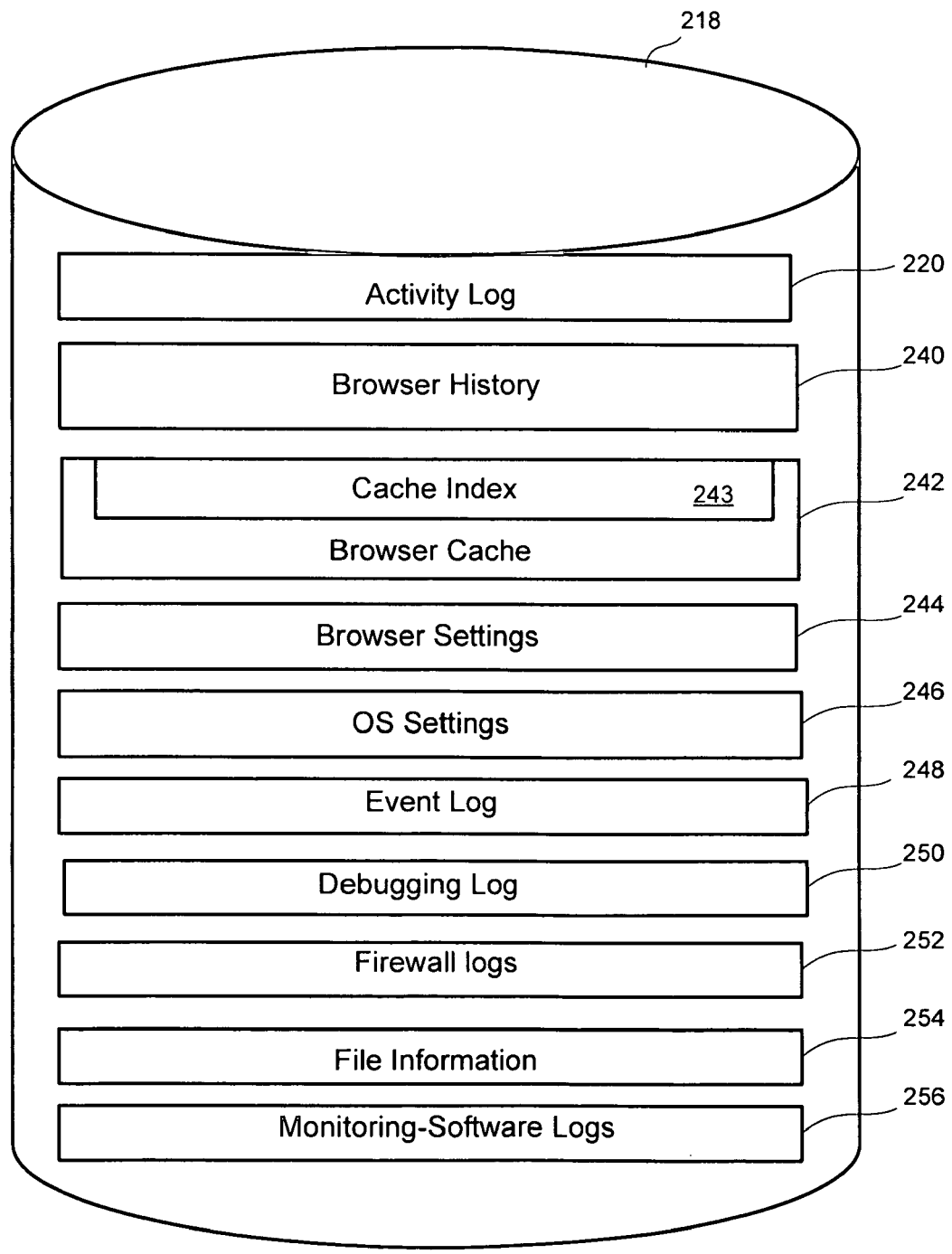
FIG. 2 is a block diagram depicting an embodiment of the file storage device of FIG. 1.

As described further with reference to FIG. 2, the N files 130 include one or more files with information that assist the research module 108 in tracing information in the N files 130 to an identity (e.g., URL) of the source of pestware 122, 124 on the computer 100. One or more of the N files 130 may be associated with an operating system of the protected computer and/or one or more applications of the protected computer, and may include information such as process IDs, registry entries, file names, cookies and URLs among other information that is used to trace from an identified pestware file, pestware process and/or pestware activity to an originating source (e.g., URL or IP address) of the infection. In one embodiment, one or more of the N files 130 is generated from an application that generates a log of data after examining the computer. An example of such an application is an application distributed under the name HijackThis.

In the exemplary embodiment depicted in FIG. 1, the research module 108 is configured to receive indications that pestware may be present on the computer from each of the detection engine 102, the heuristics engine 110 and the time stamp module 112, but this is certainly not required. In other embodiments, for example, the research module 108 may be configured to communicate only with the detection engine 102 or only with the heuristics engine. In yet other embodiments, the research module 108 may be configured to receive only a time stamp from the time stamp module 112.

According to several embodiments, pestware-detection functions operating on the protected computer 100 are represented by the detection engine 102, the quarantine engine 104, the removal engine 106, the shields 120 and the heuristic engine 110. The basic functions of the detection engine 102 is to compare files, processes and registry entries on the protected computer against known pestware definitions and characteristics. When a match is found, in addition to quarantining and removing a pestware object, the detection engine 102 informs the research module 108 of the pestware. Details associated with several embodiments of sweep, quarantine, and removal engines are found in the above-identified application entitled System and Method for Pestware Detection and Removal.

Pestware and pestware activity can also be identified by the shields 120, which generally run in the background on the computer system. In the exemplary embodiment depicted in FIG. 1, the shields 120 are divided into the operating system shields 120A and the browser shields 120B. The shields 120 are designed to watch for pestware and for typical pestware activity and includes two types of shields: behavior-monitoring shields and definition-based shields.

As an example, the shields 120 monitor the protected computer 100 for certain types of activities that generally correspond to pestware behavior. Particular examples of some of the types of activities that are monitored include a process spawning another process, an alteration to registry entries, communications with remote sites via the Internet, alterations to a start up folder, injection of a DLL into another process, and a change to the browser's home page and/or bookmarks. Some specific examples of shields are disclosed in the above-identified application entitled System and Method for Locating Malware and Generating Malware Definitions. In the exemplary embodiment, the shields 120 inform the heuristics engine 108 about the activities and the heuristics engine 108 determines whether the research module 108 should be informed and/or whether the activity should be blocked.

As an example, the heuristics module 110 may compare the activities on the computer with weighted factors to make decisions relative to activities at the protected computer. Each of these factors may be, for example, associated with a particular activity and each factor may be weighted by the likelihood that the activity is associated with pestware. If the sum of the weighted factors that match the activity history exceed a threshold, then the activity is identified as pestware activity and the heuristics module 110 prompts the research module 108 to initiate research into the origin of the pestware initiating the activity. It should be recognized that this type of heuristics operation is merely one example, and that the heuristics module 110 may use other techniques to analyze activity on the computer. Additional information related to heuristics-based scanning is found in the above-identified applications entitled System and Method For Heuristic Analysis to Identify Pestware and Client Side Exploit Tracking.

In the exemplary embodiment depicted in FIG. 1, the time stamp module 112 is configured to send a time stamp to the research module 108 in response to a request from a user and/or in response to the heuristics module 108. In some embodiments for example, the heuristics module 108 provides the user with information about suspect activity on the computer 100 so that the user has the option as to whether or not the research module 108 will attempt to identify the source of the activity.

In other embodiments, the heuristics module 110 prompts the time stamp module 112 to initiate the generation of a time stamp, without user intervention, in response to activity that is indicative of pestware activity. In one implementation, for example, the heuristics module 110 prompts the research module 108 to initiate tracing of the pestware activity to an origin of the pestware that is associated with the activity, and the heuristics module 110 also prompts the time stamp module 112 to send a time stamp 112 to the research module 108 so that the research module 108 is provided with a time reference as well as information about the pestware activities.

In yet other embodiments, the timestamp module 112 operates independently of the heuristics module 110. For example, the timestamp module 112 may prompt the research module 108 to initiate a review of the activity log 120 and/or one or more of the N files in response to a user request.

The activity monitor 116 in several embodiments monitors activities on the computer and stores information about the activities in the activity log 120 so as to assist the research module 108 in identifying activities associated with pestware and the source of the pestware. In some embodiments, for example, the activity log 120 includes a list of processes that are running on the protected computer and the files that are associated with the processes. Although not depicted in FIG. 1, the shields 120 may utilize the activity monitor 116 to detect pestware-related events and intercept efforts by pestware to spawn new processes or alter aspects of the protected computer 100.

In some variations, the activity monitor 116 may inject code into existing processes so that when a process attempts to call a function of the computer's 100 operating system (not shown) the injected code can check the process to be started and raise a flag if the existing process is attempting to create a new pestware process or attempting to alter one or more settings (e.g., a registry setting) of the protected computer 100.

In other embodiments, the activity monitor 116 is realized by a kernel-mode driver that may be loaded during a boot sequence for the protected computer or anytime later. In these embodiments, the activity monitor 116 is configured to log API calls in the activity log. In many variations for example, when a process (e.g., the pestware process) attempts to spawn a another pestware process or alter a registry entry, the API call utilized by the process is intercepted before it is carried out by an operating system of the protected computer. In this way, the attempt may be logged in the activity log 120 and the process may be analyzed to determine whether it is known to be a pestware-related process. Additional details of use of a kernel-level driver in connection with pestware management may be found in the above identified application entitled: System and Method for Kernel-Level Pestware Management.

It should be recognized that the block diagram in FIG. 1 depicts functional capabilities associated with several embodiments of the present invention. One of ordinary skill in the art will recognize that the functions described with reference to FIG. 1 may be realized by various implementations of software in connection with hardware or hardware alone. In these implementations several functions may be consolidated into a single module, for example, and as a consequence, may appear different from the block diagram in FIG. 1 without departing from the scope of the present invention.

Referring next to FIG. 2, shown are exemplary resources, also referred to herein as historical logs, that are available to the research module 108 in accordance with one embodiment of the present invention. In general, these resources are logs of historical events that occurred on the computer, and each of the logs includes information that may be used to reference other information when, for example, activities, processes and files are traced so as to determine an origin of the pestware or suspected pestware. As shown, a file storage device 218 in this embodiment includes an activity log 220, which may be generated by an activity monitor (e.g., the activity monitor 116) and may include information about processes running on the computer 100 and files corresponding to the processes. In variations, the activity log 220 includes a history of API calls and respective times made by processes running on the protected computer, but this is certainly not required.

In addition, the file storage device 218 includes a browser history 240, browser cache 242, browser settings 244, OS settings 246, an event log 248, a debugging log 250, a firewall log 252, file information 254 and monitoring software logs 256. One or more of these exemplary files 240-256 may be implemented for one or more of the N files 130 described with reference to FIG. 1.

The browser history 240 in this embodiment includes a listing of web sites and respective times that the web sites were visited by the user. The browser cache 242 in this embodiment includes files, cookies, and other objects cached in connection with use of a browser of the protected computer (e.g., Internet Explorer or Mozilla (not shown)). As depicted, the browser cache 242 includes a cache index 243 that includes a listing, which associates the content of the browser cache 242 with URLs and time stamps. As discussed further herein, the cache index 243 provides an efficient means for identifying the times objects were retrieved and the URLs that the objects were retrieved from.

The browser settings 244 include information about settings associated with a browser and may include a home page setting and list of user favorites. The browser settings 244 are monitored by the shields 120 for changes. Those settings also contain URLs that may be referenced in time stamped logs, firewall logs, browser histories, etc.

The operating system (OS) settings 246 may include registry entries, a start up folder and other information utilized by an operating system of the protected computer. As discussed further herein, data included in the OS settings 246 may include time stamps, which indicate when changes were made to the settings.

The event log 248 in this embodiment includes a log of events that is maintained by an operating system of the protected computer 100. For example, the event log 248 may include event information including errors, user log-in history, a listing of processes that have been launched (and the users that launched the processes), path information, information about which process (and which users) accessed a secure area and other information relating to operations of the computer 100.

Also shown in FIG. 2 is a debugging log 250 that includes application errors, which point to a process and the address where the error occurred. Some techniques employed by pestware forcibly shut down applications, or cause applications to crash when their memory space is injected with pestware code. The infected applications like "explorer.exe" will crash, or some times restart spontaneously. These events/occurrences show up in debugging logs. These are time stamped events, that also reference files on the system.

The firewall log 252 is this embodiment is a collection of information relating to network-related events on the protected computer. The firewall log 252, may for example, include time stamps of network activities on the protected computer, which may be utilized by the research module 108 to locate pestware or indicia of pestware.

Also shown in the data storage device 218 is a collection of file information 254, also known as the file system, which includes a database that the operating system uses to locate and store information about files. For example, the file information 254 may include the date and time a file is created, a date and time the file was last modified, the date and time the files was last accessed and the size of the file.

The monitoring-software logs 256 includes information collected from one or more pieces of monitoring software that are configured to monitor activity on the computer. As an example, the monitoring logs 256 may be generated from a filter driver, a module interfacing with a layer service provider and/or browser helper objects. It should be recognized that the logs 220, 240-256 depicted in FIG. 2 are merely exemplary and these logs are by no means representative all the potential logs that may be accessed to research origins of pestware and/or suspected-pestware.

Figure 3:
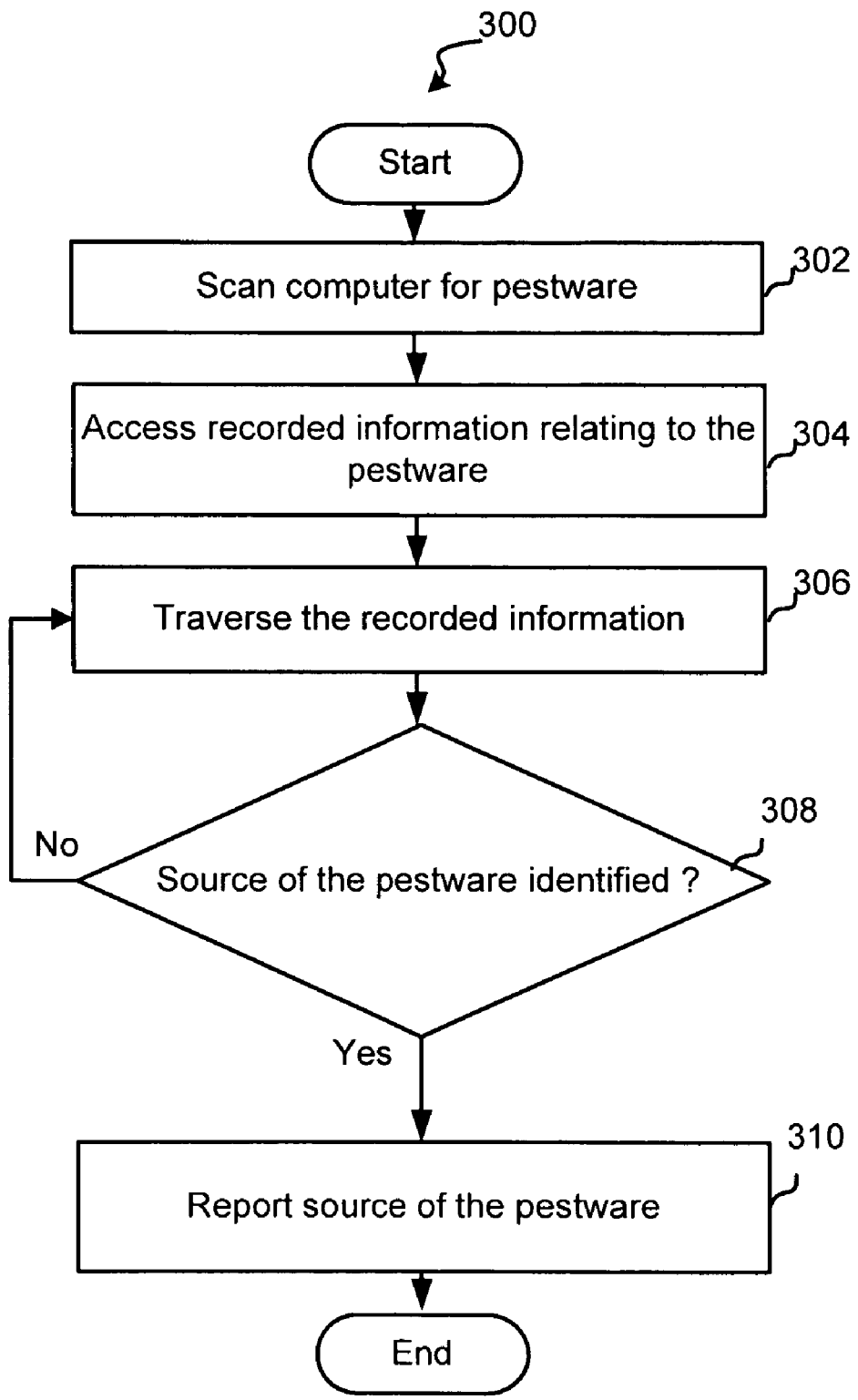
FIG. 3 is a flowchart depicting a method according to an exemplary embodiment.

Referring next to FIG. 3, shown is a flowchart depicting a method in accordance with one embodiment. Although reference will be made to FIGS. 1 and 2 for exemplary purposes, it should be recognized that the method described with reference to FIG. 3 is certainly not limited to the specific embodiments described with reference to FIGS. 1 and 2. As shown, in this embodiment a scan of a computer (e.g., the computer 100) for pestware is initially carried out (Block 302). In several embodiments for example, the detection engine 102 scans the file storage device 118, the operating system registry and executable memory of the protected computer for indicia of pestware (e.g., processes or files matching pestware definitions and/or alterations to a registry entry that are consistent with pestware).

As shown in FIG. 3, if pestware indicia is found, then recorded information (e.g., the activity log 120 and/or the N files 130) that may include traces of the pestware is accessed (Block 304), and traversed to search for information leading to the identification of the source of the pestware (Block 306). In some instances, the origin of the pestware may be identified by simply referencing one piece of data that is stored in connection with the identification of the pestware source. In other instances, however, it may be necessary to access several pieces of referential data, which may be located in one or more of the files 220-256 before arriving at the identity of the source of the pestware.

As an example, if a pestware file is found on the file storage device 118, then the cache index 243 of the browser cache 242 may be searched to identify the name of the file, and if the originating URL is stored in connection with the file, the URL is identified as the source of the file. As another example, if a pestware process is identified, a search of the activity log 220 may lead to the identity of a second process that spawned the pestware process, and additional searching of the activity log 220 using the name of the second process may lead to the identification of a pestware file associated with the second process. In turn, a search of the cache index 243 for the name of the pestware file may lead to the URL from which the pestware file was downloaded.

As shown in FIG. 3, if the source of the pestware is identified (Block 308), then the source of the pestware is reported (Block 310). In some embodiments, it is contemplate that several other computers configured in accordance with the protected computer 100 depicted in FIG. 1 may also report sources of pestware to a centralized location where the URLs may be added to a list of "bad URLs." In addition, the identified URLs may be actively searched to learn more about the pestware generated at the sites, which may help generate definitions for the pestware and may provide information about how pestware infections occur.

Figure 4:
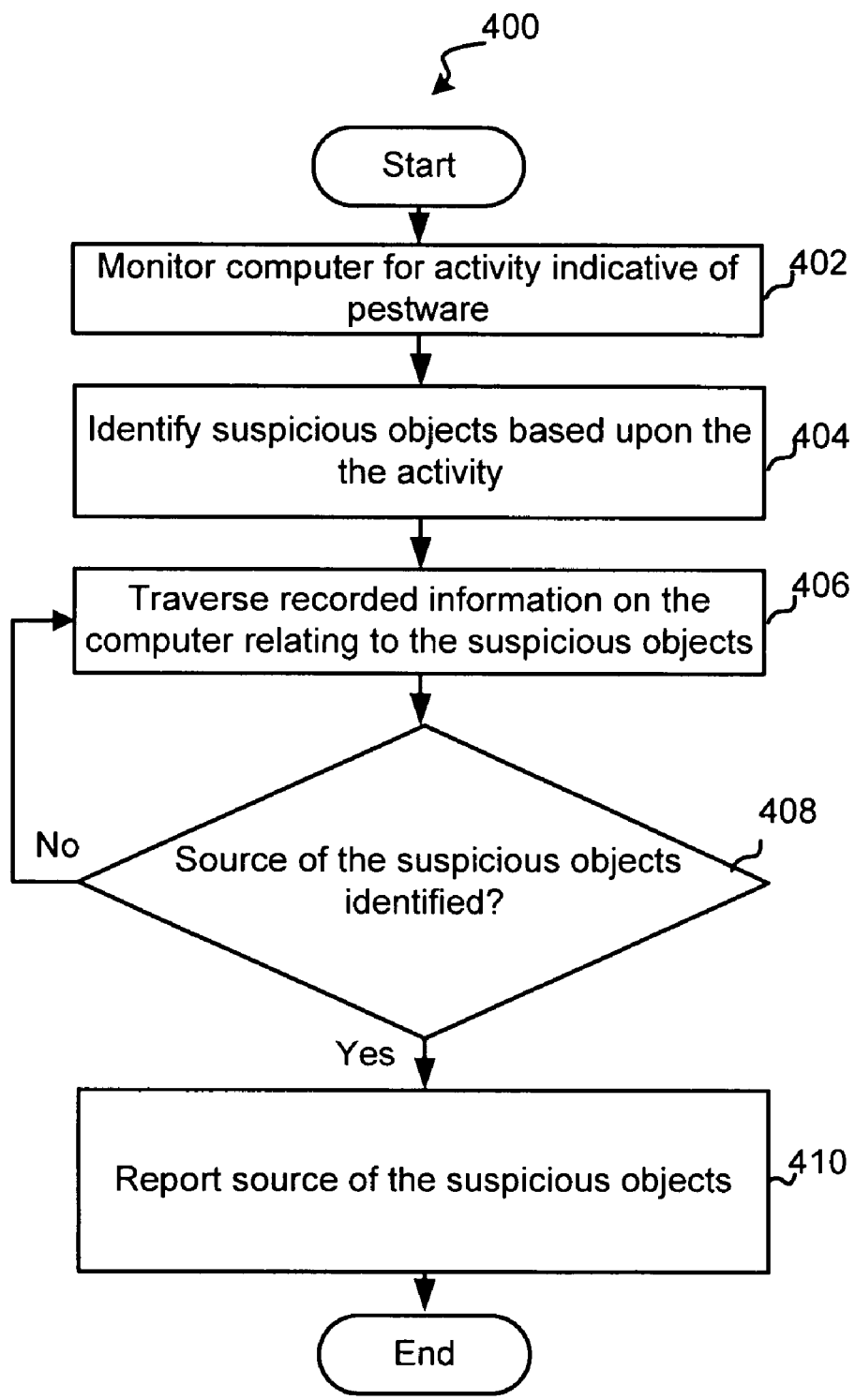
FIG. 4 is a flowchart depicting another method according to another embodiment.

Referring next to FIG. 4, shown is a flowchart depicting a method in accordance with another embodiment of the present invention. Again, reference will be made to FIGS. 1 and 2 for exemplary purposes, but it should be recognized that the method described with reference to FIG. 4 is certainly not limited to the specific embodiments described with reference to FIGS. 1 and 2. As shown, in this embodiment activity on a computer is monitored for indicia of pestware (Block 402), and if potential pestware-related activity is detected, recorded information related to the activity is searched to identify one or more suspicious objects (e.g., files and/or processes) that are related to the activity (Block 404). In some embodiments, the shields 120 (described with reference to FIG. 1) may monitor the protected computer 100 for activities, and if the activity is identified as potential pestware activity (e.g., by the heuristics module 110), then the research module 108 searches the activity log 120 and/or one or more of the N files for information relating to the pestware-related activity.

As shown in FIG. 4, recorded information (e.g., one or more of the N files) is then traversed to trace through information related to the suspicious objects that leads to an origin of the suspicious objects (Block 406). In one embodiment for example, the suspicious activity leads to a search for suspicious processes and/or files related to the activity (e.g., using the activity log 120), which then leads to a search of one or more of the N files 130 (e.g., the cache index 243) for an indication of the source of the suspicious process and/or files.

As depicted in FIG. 4, if the source of the suspicious object(s) is identified (Block 408), then the source of the suspicious object(s) is then reported (e.g., to a pestware research entity). In this way, the suspicious objects and the web sites originating the suspicious objects may be further researched to establish the extent to which they may be a threat.

As an example of pestware-related activity that may trigger the search for a source of the activity, if a series of particular API calls is made in a pattern known to be associated with pestware, the process(es) making the calls may be identified using, for example, the activity log 120. In turn, the activity log 120 may be used to identify the file(s) associated with the process(es), and the cache index 243 may be utilized to search for a source of the file(es). It should be recognized that this is merely one example of the type of activity that may trigger backwards researching of logs on a computer, and that patterns in process creation, downloaded files, changes to an operating system registry and browser settings, for example, may trigger a search of the computer's logs.

Figure 5:
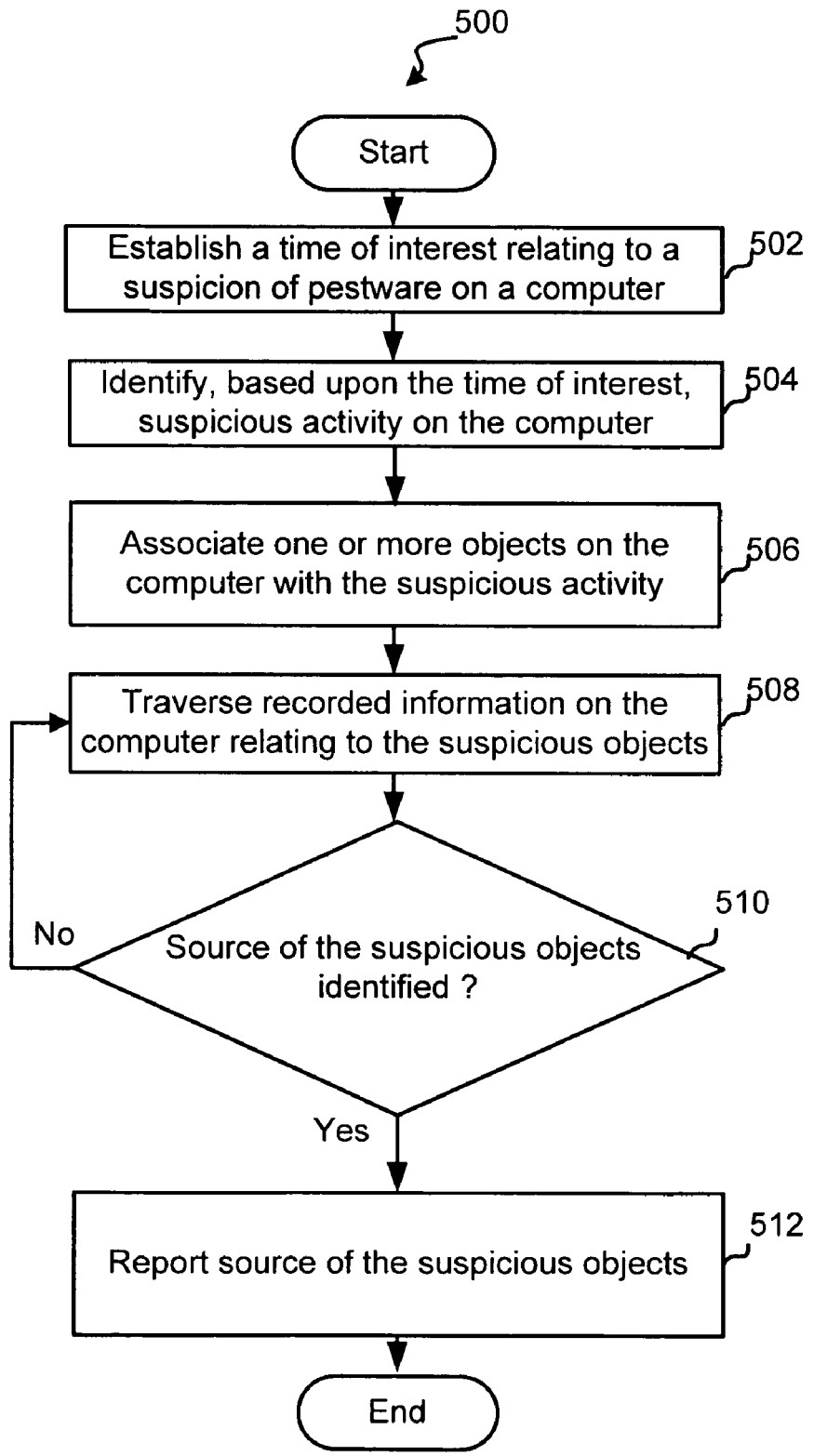
FIG. 5 is a flowchart depicting yet another method according to yet another embodiment.

Referring next to FIG. 5, shown is a flowchart depicting yet another method in accordance with another embodiment of the present invention. While referring to FIG. 5, simultaneous reference will be made to FIGS. 1 and 2 for exemplary purposes, but it should be recognized that the method described with reference to FIG. 5 is certainly not limited to the specific embodiments described with reference to FIGS. 1 and 2.

As shown, in this embodiment a time of interest is initially established based upon a suspicion that pestware has infected a computer (Block 502). In some embodiments, for example, a user may establish the time of interest based upon events the user observed (e.g., pop-ups or a system crash). In one embodiment, as discussed with reference to FIG. 1, in response to a user request, the time stamp module 112 may issue a time stamp and initiate research that is related to activity occurring at or around the time of the time stamp. In variations, the user is provide with an alert in response to the heuristics module 110 identifying an activity that is suspicious and the user is given an option to initiate research at or around the time of interest.

In other embodiments, the time stamp module 112 automatically generates a time stamp in response to a report of suspicious activity (e.g., from the shields 120 or heuristics module 110).

As shown in FIG. 5, once a time of interest is established, suspicious activity is identified on the computer based upon the time of interest (Block 504). The time of interest may be established, for example, to include a time period before the time stamp is issued so that a search for suspicious activity is limited to a particular time period. In some embodiments, the activity log 130 and/or one or more of the N files 130 are accessed and analyzed to determine whether any activity during the time of interest is suspicious (e.g., the activity indicates in some way that it may be associated with pestware). As an example, if any logged information (e.g., in the activity log 130 and/or one or more of the N files 130) indicates that during the time of interest that, for example, access to the registry was carried out in connection with a downloaded file or the launch of a process, the activities may identified as being suspect and further research relative to the process and the file may carried out.

Beneficially, many of the logs accessed include time-stamped information, which enables an activity that occurred during the time of interest to be readily identified and analyzed either alone or in connection with other activities occurring during the time of interest. As an example, the activity log 220, the browser history 240, browser cache 242, operating system setting 246, the event log 248, the debugging log 250 the firewall log 252, the file information 254 and the monitoring software logs 256 include time stamped information that provides insight into the activities that occurred on the computer during the time of interest.

As depicted in FIG. 5, once one or more activities are identified as being suspicious (Block 504), one or more objects (e.g., processes or files) on the computer are associated with the suspicious activity (Block 506). For example, the research module 108 may search the activity log 120 and/or one or more of the N files for information that associates the suspicious activity to one or more processes and the processes may be related to one or more files.

As shown in FIG. 5, recorded information on the computer is then traversed in order to trace to an origin of one or more of the objects (Block 508). For example, a search of one or more of the N files 130 (e.g., the cache index 243) may be carried out to identify the source of a suspicious process and/or files. Once the source of the suspicious object(s) is identified (Block 510), the source is then reported (e.g., to a remote research entity)(Block 512).

It should be recognized that the methods described with reference to FIGS. 3, 4 and 5 are merely exemplary and are certainly not the only modes of operation that are contemplated. As an example, the establishment of a time of interest, as discussed with reference to FIG. 5, may be useful in the method described with reference to FIGS. 3 and 4 for identifying information that leads to the source of the pestware or pestware-related activities. Moreover, it is contemplated that aspects from all three of the methods described with reference to FIGS. 3, 4 and 5 may be combined.

In conclusion, the present invention provides, among other things, a system and method for identifying a source of pestware or suspected pestware on a computer. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for identifying an origin of activity on a computer that is indicative of pestware comprising:
   monitoring, using a kernel-mode driver, the computer for activity that is indicative of pestware, wherein the monitoring includes monitoring API calls and storing a history of at least a portion of the API calls in an activity log;
   analyzing, heuristically, computer activity to determine whether one or more weighted factors associated with an activity exceeds a threshold so as to arrive at a determination that the activity is indicative of pestware;
   identifying, based upon the activity, an object residing on the computer that is a suspected pestware object;
   accessing, in response to the identifying an object, at least a portion of a recorded history of externally networked sources that the computer received files from so as to identify a reference to an identity of a particular externally networked source that the suspected pestware object originated from; and
   reporting the identity of the particular externally networked source to an externally networked pestware research entity so as to enable the externally networked pestware research entity to research whether the particular externally networked source is a source of pestware.

2. The method of claim 1, wherein the particular externally networked source is identified by an identifier selected from the group consisting of an I.P. address and a URL.

3. The method of claim 2, wherein the identifying includes accessing an activity log that includes information that relates the activity to the suspected pestware object.

4. The method of claim 1, wherein the recorded history resides in a browser cache, which includes information about files downloaded to the computer and a source of each of the files.

5. The method of claim 1, wherein the recorded history resides in at least one log selected from the group consisting of an activity log, a browser history, browser cache, browser settings, operating system settings, an event log, a debugging log, a firewall log, file information and monitoring software logs.

6. A system for identifying a source of activity on a computer that is indicative of pestware including:
   an activity monitor configured to monitor API calls and to store a history of at least a portion of the API calls in an activity log, wherein the activity monitor includes a kernel-mode driver adapted to intercept the API calls;
   a heuristics module configured to identify an activity on the computer that is indicative of pestware residing on the computer and to analyze the activity to determine whether one or more weighted factors associated with the activity exceeds a threshold; and
   a research portion configured to access, in response to a prompt from the heuristics module, a first set of recorded information on the computer that relates the activity to at least one file residing on the computer, and wherein the research portion is configured to access a second set of recorded information on the computer that relates the at least one file to an externally networked source from which the file was received; and
   a reporting portion configured to generate a report that identifies the externally networked source of the file and to report an identity of the externally networked source to an externally networked pestware research entity so as to enable the externally networked pestware research entity to research whether the externally networked source is a source of pestware.

7. The system of claim 6, wherein activity monitor is configured to store an identity of each process that made each of the API calls in the stored history, and wherein the activity monitor is configured to store an identity of each file that corresponds to each the processes that made the API calls in the stored history so as to create a relation between each API call and at least one file.

8. The system of claim 6, wherein the heuristics module is configured to receive information about the API calls from the activity monitor and determine whether the API calls are indicative of pestware.

9. The system of claim 6, wherein the first set of recorded information and the second set of recorded information reside in the same log file on a file storage device of the computer.

10. The system of claim 6, wherein the externally networked source is identified by an identifier selected from the group consisting of an I.P. address and a URL.

11. The system of claim 6 wherein the recorded history resides in at least one log selected from the group consisting of an activity log, a browser history, browser cache, browser settings, operating system settings, an event log, a debugging log, a firewall log, file information and monitoring software logs.

12. A non-transitory computer-readable medium including processor-executable instructions for identifying an origin of activity on a computer that is indicative of pestware, the instructions including instructions for:

monitoring, with a kernel-mode driver, the computer for activity that is indicative of pestware, wherein the instructions for monitoring include instructions for monitoring API calls and storing a history of at least a portion of the API calls in an activity log;

analyzing, heuristically, computer activity to determine whether one or more weighted factors associated with an activity exceeds a threshold so as to arrive at a determination that the activity is indicative of pestware;

identifying, based upon the activity, an object residing on the computer that is a suspected pestware object;

accessing, in response to the identifying an object, at least a portion of a recorded history of externally networked sources that the computer received files from so as to identify a reference to an identity of a particular externally networked source that the suspected pestware object originated from; and reporting the identity of the particular externally networked source to an externally networked pestware research entity so as to enable the externally networked pestware research entity to research whether the particular externally networked source is a source of pestware.

13. The non-transitory computer-readable medium of claim 12, wherein the particular externally networked source is identified by an identifier selected from the group consisting of an I.P. address and a URL.

14. The non-transitory computer-readable medium of claim 12, wherein the recorded history resides in at least one log selected from the group consisting of an activity log, a browser history, browser cache, browser settings, operating system settings, an event log, a debugging log, a firewall log, file information and monitoring software logs.

* * * * *